Figure 3:
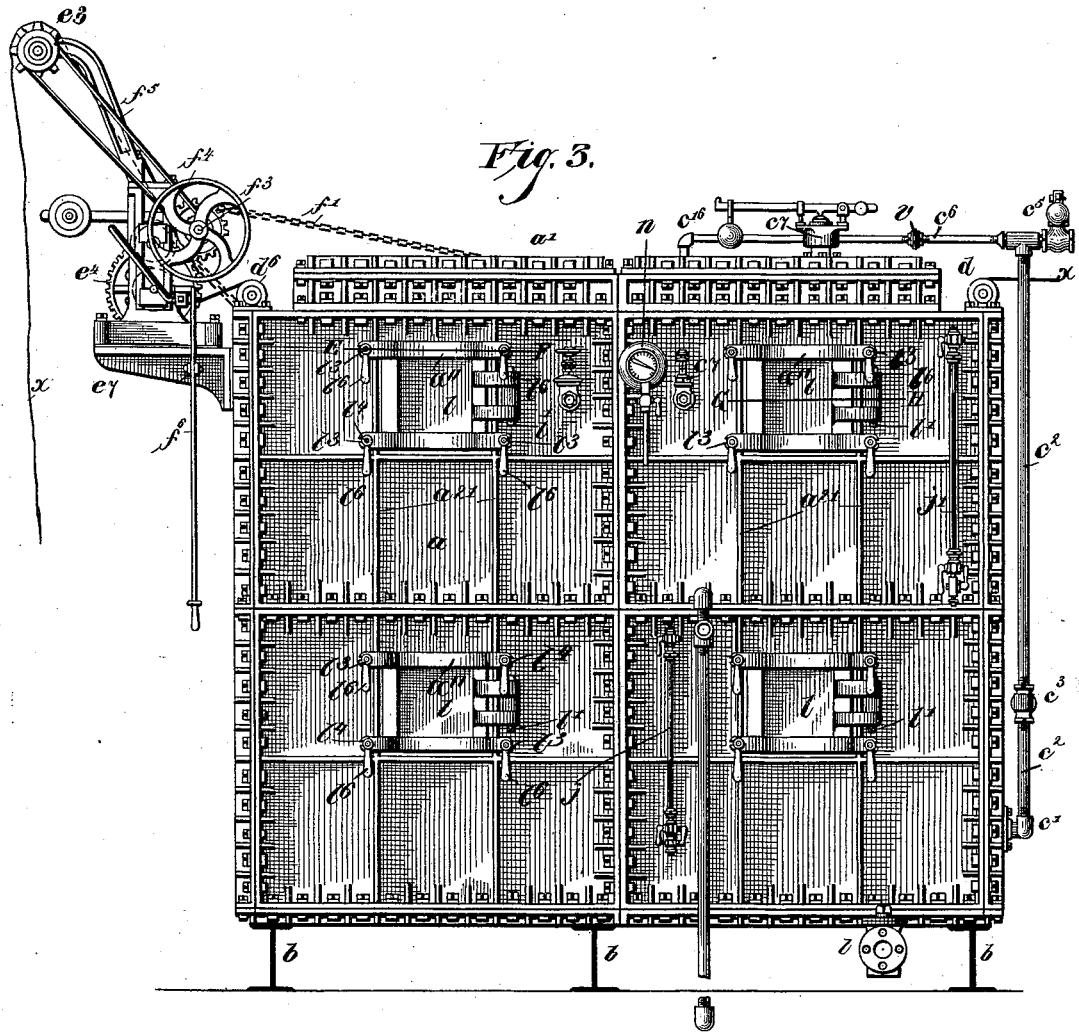

(No Model.) 5 Sheets—Sheet 1.
E. BENTZ, C. & A. EDMESTON & E. GRETHER.
H. ORTH, Administrator of E. GRETHER, Deceased.
APPARATUS FOR AND PROCESS OF BLEACHING, &c.
No. 507,404. Patented Oct. 24, 1893.
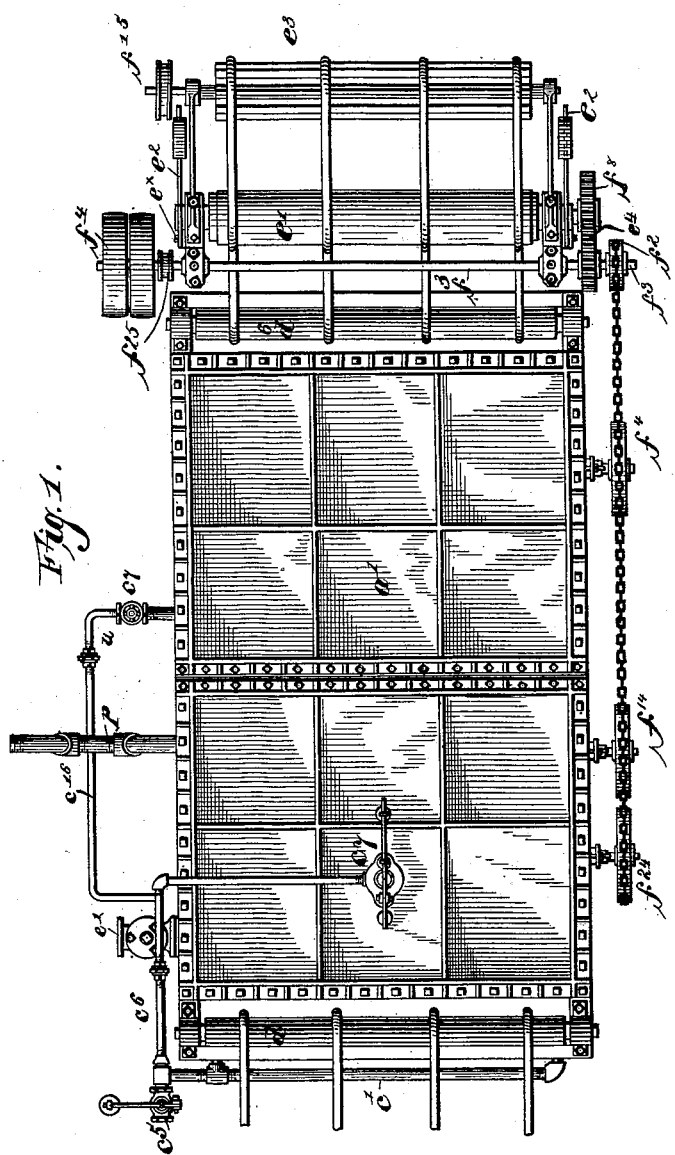
Inventors:
Ernest Bentz,
Charles Edmeston,
Alfred Edmeston,
Henry Orth, Administrator
of Ernest Grether, deceased.
Witnesses,
H. G. Dieterich
P. W. Sommers
By Henry Orth
Atty.

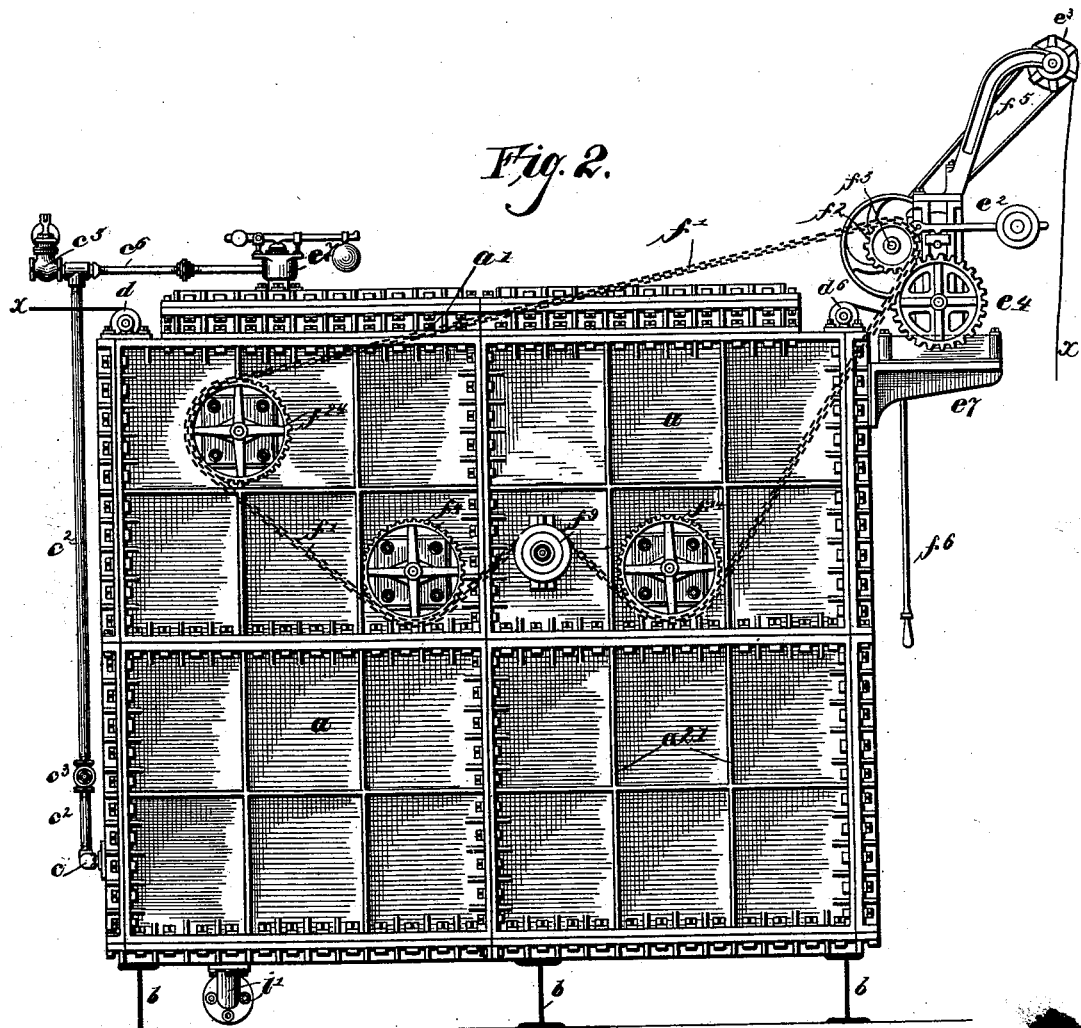

(No Model.) 5 Sheets—Sheet 3.

E. BENTZ, C. & A. EDMESTON & E. GRETHER.
H. ORTH, Administrator of E. GRETHER, Deceased.
APPARATUS FOR AND PROCESS OF BLEACHING, &c.

No. 507,404. Patented Oct. 24, 1893.

Witnesses:
H. G. Dieterich
B. W. Sommers

Inventors:
Ernest Bentz,
Charles Edmeston,
Alfred Edmeston
Henry Orth, Administrator
of Ernest Grether, deceased
By [signature] Atty:

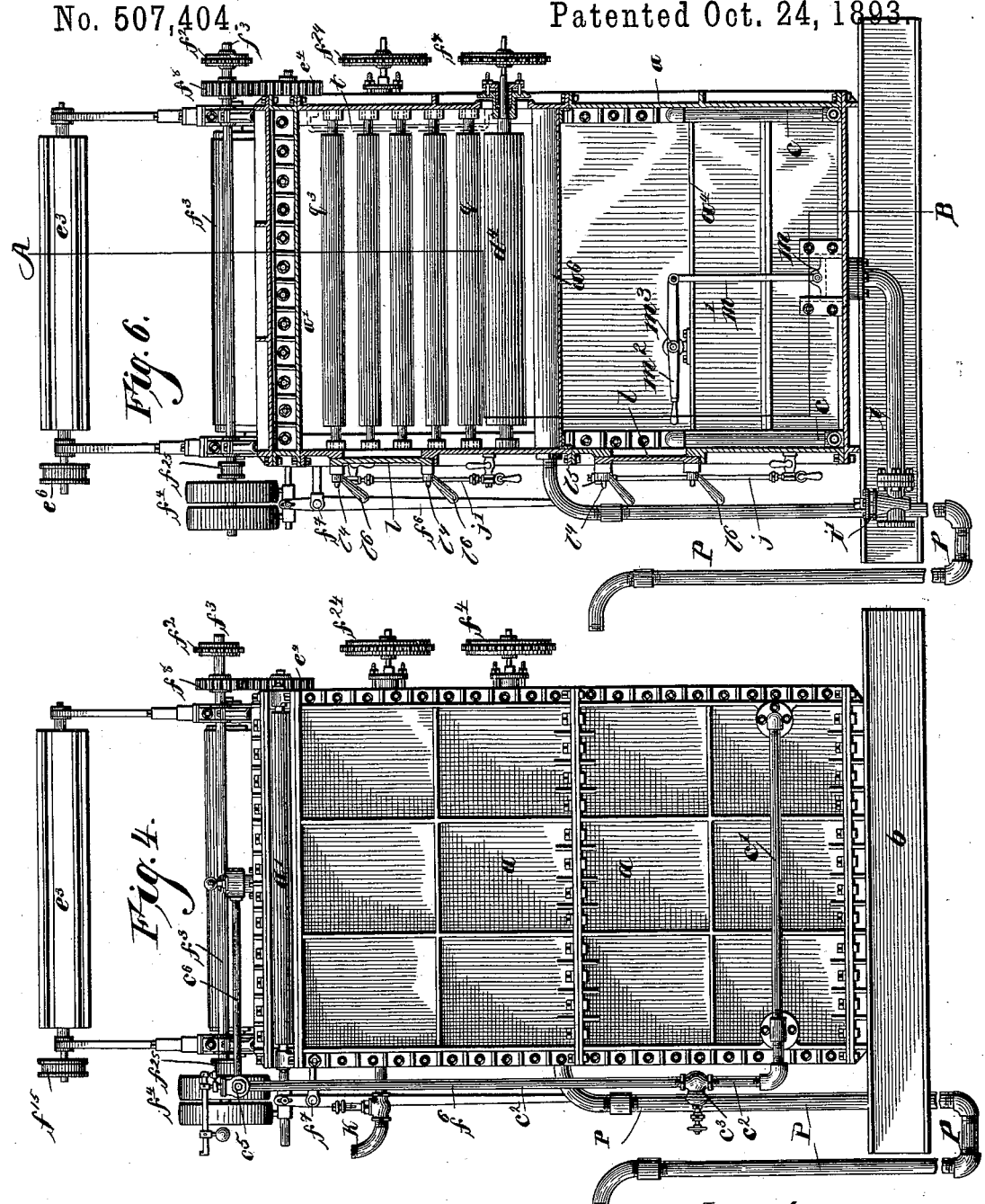

(No Model.) 5 Sheets—Sheet 5.
E. BENTZ, C. & A. EDMESTON & E. GRETHER.
H. ORTH, Administrator of E. GRETHER, Deceased.
APPARATUS FOR AND PROCESS OF BLEACHING, &c.
No. 507,404. Patented Oct. 24, 1893.
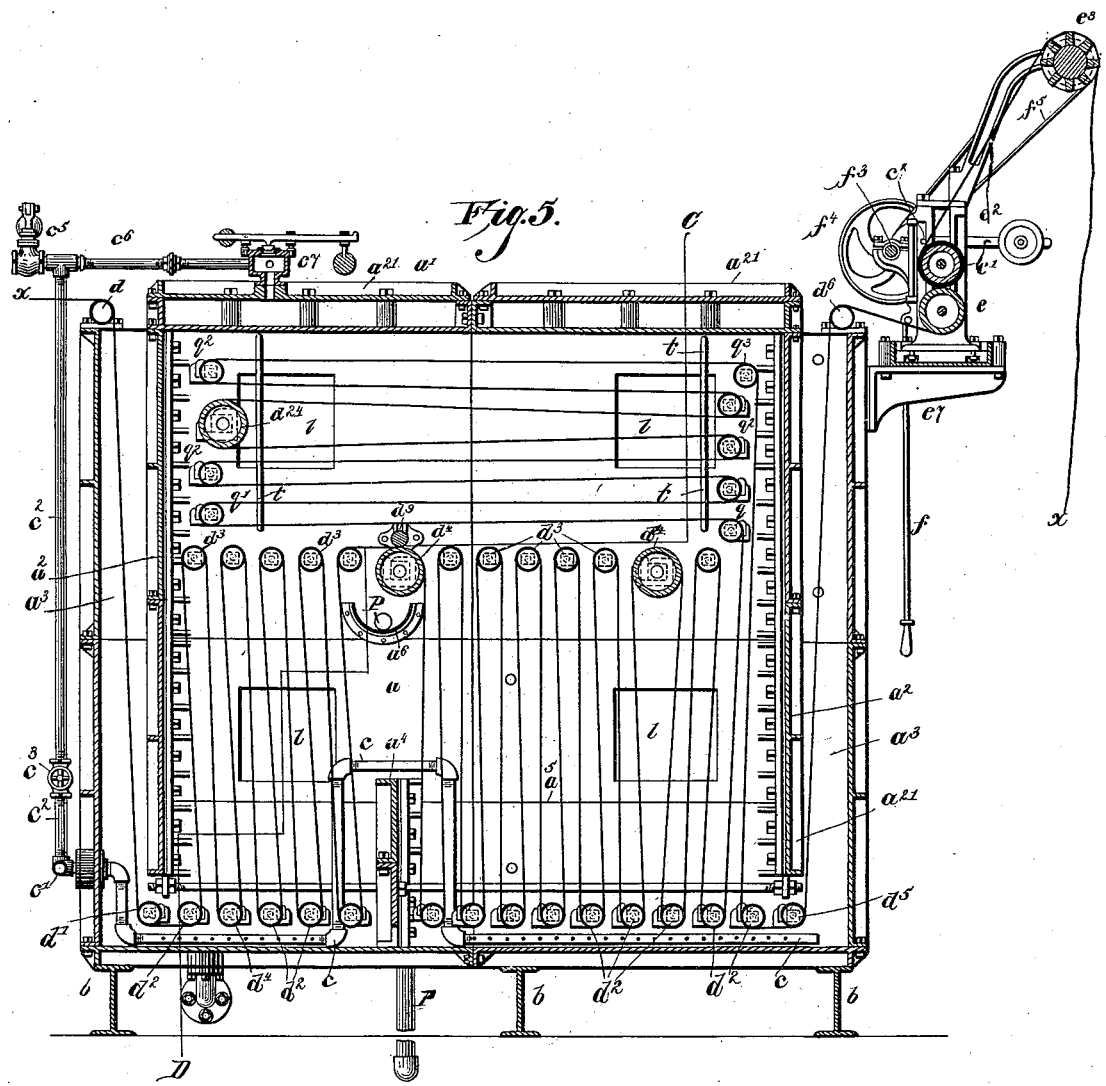
Inventors:
Ernest Bentz,
Charles Edmeston,
Alfred Edmeston,
Henry Orth, Administrator
of Ernest Grether, deceased,
Witnesses:
H. G. Dieterich
B. W. Sommers.
Atty.

UNITED STATES PATENT OFFICE.

ERNEST BENTZ, OF MANCHESTER, AND CHARLES EDMESTON AND ALFRED EDMESTON, OF SALFORD, ENGLAND, AND HENRY ORTH, OF WASHINGTON, DISTRICT OF COLUMBIA, ADMINISTRATOR OF ERNEST GRETHER, DECEASED.

APPARATUS FOR AND PROCESS OF BLEACHING, &c.

SPECIFICATION forming part of Letters Patent No. 507,404, dated October 24, 1893.

Application filed September 10, 1891. Serial No. 405,300. (No model.) Patented in England April 2, 1889, No. 5,590; in France January 28, 1890, No. 203,420; in Italy February 2, 1890, LIII, 8, and in Austria-Hungary May 3, 1890, No. 1,528.

*To all whom it may concern:*

Be it known that we, ERNEST BENTZ, chemist, residing at Manchester, and CHARLES EDMESTON and ALFRED EDMESTON, engineers, residing at Salford, in the county of Lancaster, England, subjects of the Queen of Great Britain, and ERNEST GRETHER, deceased, late of Salford, in the said county of Lancaster, England, have invented certain new and useful Improvements in the Art of Scouring, Cleansing, or Bleaching Textiles, (for which we have obtained Letters Patent in England under date of April 2, 1889, No. 5,590; in France, No. 203,420, dated January 28, 1890; in Austria-Hungary, Vol. XL, No. 1,528, dated May 3, 1890, and in Italy, Vol. LIII, No. 8, dated February 2, 1890;) and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention relates to the art of scouring, cleansing and bleaching fabrics, warps or yarns made of cotton or other vegetable fibers, and has for its object the provision of means whereby the operation of scouring or cleansing, or of scouring or cleansing and bleaching may be carried out more expeditiously, more economically, and more effectually than has been done by the processes of and means for these purposes heretofore available.

In the treatment of the class of manufactures above referred to either for purposes of scouring or cleansing or for the purposes of bleaching, steam has been used as a separate and independent step in the treatment, and such manufactures have been subjected to the action of steam before entering or after leaving the scouring or cleansing or bleaching liquor. We have found that much better results are attained by alternately subjecting the fabric or warp or yarn to the action of the scouring or cleansing or bleaching liquor and to the action of steam, the alternate action of the steam in the operation of scouring or cleansing tending to accelerate the removal of dirt, &c., while in bleaching the steam is a great assistant in increasing the bleaching properties of the liquor, especially where alkaline or caustic alkaline solutions are employed as a scouring or bleaching agent. The result of the alternate action of the steam and liquor is however greatly enhanced when the material treated is afterward subjected to the action of steam alone under a pressure above atmospheric pressure for a longer or shorter period.

The invention therefore consists in an improved mode of and means for treating textile, as will now be fully described, reference being had to the accompanying drawings, in which—

Figure 1 is a top plan view; Figs. 2 and 3 opposite side elevations and Fig. 4 an end elevation taken from the feed end of an apparatus or machine embodying our invention. Fig. 5 is a vertical longitudinal section taken on or about on line A—B, of Fig. 6, and Fig. 6 is a like cross section taken on or about on line C—D, of Fig. 5, and Figs. 7 and 8 are sections taken respectively on lines E—F, and G—H, of Fig. 3.

The apparatus which is virtually what is known as a keir, and which for the purposes of this description will hereinafter be so denominated, consists of a vessel, $a$, of rectangular form in section, constructed of metal plates provided with flanges for the purposes of uniting the same by means of bolts and nuts, or rivets, so as to be fluid tight, and with strengthening ribs, $a^{21}$, to enable such vessel to resist the internal pressure. At top the vessel is provided with a steam jacket, $a'$, for the purpose of preventing radiation of heat from the interior and for the purpose of maintaining the temperature within the keir in a normal or approximately normal condition. At each end of the keir is a chamber, $a^3$, that is open at top and in communication with the interior of the keir at the bottom below the partition walls, $a^2$. At the upper end of each of said chambers is mounted a guide roll, the one at the left or feed end of the keir being indicated by the letter, $d$, and the one at the right or delivery end by the letter, $d^6$.

As shown in Figs. 5 and 6, the keir is divided into two shallow compartments and preferably of unequal area, the compartment at the feed end being the smaller, by means of a partition wall, $a^4$, extending from side to side of the keir and having formed therein midway of its length a port normally closed by a sluice gate or valve, $m$, sliding in suitable guides and connected by a rod, $m'$, with the valve operating lever, $m^2$, fulcrumed at $m^3$, in a bearing secured to the top of said partition, $a^4$. This partition, $a^4$, is of such height as to prevent the liquor from flowing over the same during the operation of scouring or cleansing or bleaching, for purposes hereinafter explained, the object of the sluice or valve being to allow the liquor in the chamber on the right of the partition to flow into that on the left, when it is desired or when it becomes necessary to empty the keir of its liquid contents, for which purpose the exhaust pipe, $i$, is provided, see more particularly Fig. 6, which pipe has a suitable valve, gate, or stopcock, $i'$. Access is had to the valve lever through the lower left hand door, $l$, of which there are preferably four, as shown in Fig. 3, one of said doors being also shown in Figs. 7 and 8. These doors are hinged at $l'$, and have an upper and lower locking bar, the forked or slotted ends, $l^3$, of which project beyond the door corners for the reception of locking bolts, $l^4$, that are pivoted on vertical pintles, $l^2$, secured to the keir wall, so that by loosening the locking nuts, $l^5$, by means of their handles, $l^6$, the bolts $l^4$, can be tilted to one side out of the slotted ends, $l^3$, of the locking bars, and the doors, $l$, swing open. A tight joint is obtained by forming a boxing or housing around the door openings into which the doors, $l$, fit, such boxing or housing being formed or may be formed in part by the strengthening ribs, $a^{21}$, and a transverse rib, $a^{11}$, Fig. 3. Such joint may however be obtained in any other desirable manner.

Near the bottom of the keir are provided bearings for a series of guide rolls, the initial and terminal rolls, $d'$, $d^5$, of the series being located between the partitions, $a^2$, and the bottom of the keir so as to properly guide the material coming from the feed guide roll, $d$, to the conveying rolls within the keir proper, and after leaving said rolls, to the delivery roll, $d^6$, as more fully described hereinafter.

Above the lower series of guide rolls, $d'$, $d^2$, $d^5$, at a considerable distance above the normal level, $a^5$, of the liquid in the keir, suitable bearings are provided for a series of supporting rolls, some of which perform the function of driving rolls, which latter are of greater diameter, and are indicated by letters, $d^4$ and $d^{14}$, the other conveying rolls of the upper set being indicated by letter $d^3$. Finally, above these conveying rolls the keir is provided at opposite ends with proper bearings for a series of superposed rollers, of which the roller, $d^{24}$, of greater diameter than the other rollers, performs also the function of a driving roll. The initial roll, $q$, of the end series of rolls, $q^2$, is located relatively to the roll $d^2$, next to the last of the series of such rolls, so as to take the material therefrom, while the terminal roll, $q^3$ of the series of end rolls, is located relatively to the last of the series of rolls, $d^2$, namely the one next to roll, $d^5$, so as to guide the fabric to said roll, $d^2$, from which it passes to roll, $d^5$.

The textile material is prevented from passing off the end rolls by guide bars, $t$, secured to the side walls of the keir as shown in Fig. 5, and in dotted lines in Fig. 6.

A squeezing roll, $d^9$, is arranged in suitable bearings to co-operate with the conveying and driving roll, $d^4$, and beneath said driving roll is arranged a trough, $a^6$, for the reception of the liquid squeezed out of the textile material, such liquid being conducted through siphon pipe, $p$, into a suitable receiver wherein it is allowed to settle, and when freed from impurities is decanted and returned to the keir. The textile materials to be scoured or cleansed contain usually more or less foreign matter in the shape of dirt, and other foreign substances, and in order to eliminate these foreign substances and provide for a clean bath through which the textile material passes before leaving the keir, we divide the latter as described, and provide the squeezing roll at the point where the textile material passes from one bath into the other. A portion of the foreign substances is washed out in the left hand chamber as the textile material passes through the same, but the larger portion is dissolved and squeezed out by the squeezing roll and removed from the keir as above described. On the other hand, the exhaust being located in the compartment where the textile material first enters, the liquid therein may be drawn off whenever it becomes too highly charged with impurities without disturbing the liquor in the other compartment, which is a great advantage. Of course the siphon pipe, $p$, will have to be of such length as to provide a sufficient head or resistance when filled with liquor to prevent the escape of steam from the keir or the access thereto of air, which is very injurious to the textile material when the bleaching is effected by means of a caustic alkaline bleaching agent. There is however is still further advantage in dividing the keir as described, in that different kinds or liquids may be used in the treatment of textiles, of liquids having different properties and a different action upon the material.

Steam is supplied to the jacket, $a'$, through pipe $c^6$, provided with a reducing valve, $c^5$, of any usual construction, said pipe being connected with a steam generator. The water of condensation is exhausted from the jacket into a steam trap of any well known construction, and which it has been deemed unnecessary to illustrate; $c^7$, is a safety valve connected with pipe, $c^6$, and with jacket, $a'$.

The pipe, $c^6$, has a branch, $c^{16}$, connected with the valve coupling, $u$, Figs. 1 and 6, the pipe in the latter figure being shown in dotted lines, through which steam is supplied to the steam chamber of the keir above the level of the liquid therein. A second larger branch pipe, $c^2$, is connected with pipe, $c^6$, or with the delivery branch of the reducing valve, $c^7$, to which pipe, $c^6$, is connected. The pipe, $c^2$, is provided with a regulating valve, $c^3$, and its lower end is connected with a horizontal branch pipe, $c'$, (Figs. 1, 2, 4 and 5,) that has its ends connected with a pipe, $c$, arranged longitudinally of the keir along its opposite sides, said pipe extending over the partition, $a^4$, thence again along the bottom of the keir to near the right hand end thereof, the end of the pipes being closed. Those portions of the pipes, $c$, that extend along the bottom of the keir are perforated so as to supply steam directly to the liquor for the purpose of heating the same to boiling or to any other desired degree.

The textile material is propelled through the keir by an endless chain, $f'$, passed around spur or sprocket wheels, $f^4$, $f^{14}$, $f^{24}$, on the journals of the several rolls, $d^4$, $d^{14}$, $d^{24}$, and over a like wheel, $f^2$, on a driving shaft, $f^3$, that carries the loose and fast pulleys, $f^8$, a belt shifting lever, $f^6$, Fig. 6, fulcrumed at $f^7$, being provided for shifting the belt, that connects the driving shaft with any suitable prime motor, from one pulley to the other, and $f^9$, Fig. 2, is a tension pulley of usual construction and function.

The driving shaft has its bearings in suitable brackets or standards on top of the keir at the exit end in which are also mounted two squeezing rolls, $e$, and $e'$; the upper squeezing roll has vertical motion in its bearings and is held in roll, $e$, by means of weights adjustable on levers, $e^2$, fulcrumed to the bearing brackets and bearing upon the journals of said upper roll, see more particularly Fig. 1. The driving shaft, $f^3$, also carries a pinion, $f^8$, that is in gear with a pinion on the lower squeezing roll, and $e^3$, is a ribbed delivery roll journaled in arms secured to the bracket bearings or standards, said roll being driven by a belt, $f^5$, Fig. 5, on pulleys, $f^{15}$, $f^{25}$, on roll, $e^3$, and driving shaft, $f^3$, respectively. See Fig. 1 The liquid squeezed out of the textile material between rolls, $e$, $e'$, falls into a trough, $e^7$, from whence it is conducted to the chamber, $a^2$, at the receiving end of the keir by a pipe, not shown.

The keir is finally provided with a steam gage, $n$, a level indicator, $j$, for one of the lower compartments containing the liquid, and with a like indicator, $j'$, for one of the outer open chambers, $a^3$, and with a safety valve $k$, for the upper steam chamber or space. See Fig. 6.

The keir as constructed is supported on iron beams or sills, $b$, as shown. In scouring, cleansing or bleaching textile fabrics the latter may be passed through the keir in a spread or stretched condition as regards the width of the fabric. We obtain however equally good results by passing such fabrics through the keir in what is known as the rope form, that is to say, the fabric is gathered but not twisted, so that a number of pieces may be simultaneously passed through the keir, as indicated in Fig. 1.

In carrying out our improvement we subject the textile to the action of steam under a pressure higher than but preferably near atmospheric pressure, though we may operate under higher or lower pressures, the best results being however attained when operating under a pressure higher than but approximating atmospheric pressure.

In starting the operation with a fabric in rope form for instance, a sufficiently strong tape of proper length is secured to one end of each rope and threaded through the keir to the delivery roll. The two compartments are then supplied with the liquor, as for instance a solution of caustic soda, steam is admitted to the jacket, $a'$, and the keir, and the air driven out of the latter through safety valve, $k$, for instance, which is afterward closed, and further steam supplied through both pipes, $p$, and $c^{16}$, until steam gage, $n$, Fig. 3, indicates the desired pressure, and the solution has been heated to boiling point, such liquid rising in the end chambers, $a^3$, under the steam pressure until the volume of liquor in said chambers counterbalances the pressure in the keir. Should it be desirable to operate under greater pressures than those stated, the chambers, $a^3$, may be extended upwardly to any desired heighth to permit the liquor to rise therein. The driving shaft, $f^3$, is now set in motion to first draw the tapes through the keir and then the ropes of fabric which pass first over roller, $d$, down to and around rollers, $d'$, and $d^2$, of the lower series of rollers, thence upward and around the first roller, $d^3$ of the upper series of rollers, thence again down to the next roller, $d^2$, and so on alternately until the ropes of fabric reach the supporting and driving roller, $d^4$, at which point a portion of the liquid is squeezed out for purposes hereinabove stated, and from said roller, $d^4$, the fabrics pass in a similar manner to the roller, $d^2$, next to the two last rollers of the lower series, and from thence to the upper end roller, $q$, and alternately from roller, $q$, to $q'$, and $d^{24}$, and so on to roller, $q^3$, from which the ropes pass downward again to and around the last two rollers, $d^2$, $d^5$, of the lower series, thence up through chamber, $a^3$, to roller, $d^6$, to and between the squeezing rollers, $e$, $e'$, and finally to and over the ribbed roller, $e^3$, and thence to the floor or to a suitable receiver. Before the end of the ropes enter the keir we attach tapes thereto which are then threaded through the keir by the fabric, and when so threaded they are detached and left in the keir for the next batch of ropes. Injectors or pumps or other suitable means are employed to supply the keir with the solution and to maintain the volume therein substantially constant.

By using tapes instead of a chain to thread the fabric or ropes of thread through the machine and attaching like tapes to the end or terminal of such fabric or ropes before such end passes into the keir and detaching the same after said end or terminal has passed out of the keir, we save considerable labor.

It will be observed that the textile material during its passage through the keir is alternately subjected to the action of the bleaching liquor and to that of steam under pressure, and before leaving the keir such material is first subjected to the action of steam for a much longer period than previously and under occlusion of atmospheric air. On the other hand, the material leaves the keir in a much cleaner condition than would be the case if said material were to pass through one and the same bath, the dirtier liquid being squeezed out and carried off before the material reaches the second compartment.

We have hereinbefore stated that the invention above described has been patented in England, and this is true as to its general features. We would however call attention to the fact that there are improvements described and shown in this our application that are described but not shown in our said English patent, while others are neither described nor shown therein, the most important of which relates to the partitioning of the keir and the use of the tape for threading the material treated through the keir.

Having thus described our invention, what we claim is—

1. In the art of scouring, cleansing or bleaching, the improvement which consists in alternately saturating a continuously moving web or rope of material with bleaching or cleansing or scouring liquor and steam, and conducting the operations under exclusion of atmospheric air.

2. In the art of scouring, cleansing or bleaching, the improvement which consists in alternately saturating a continuously moving web or rope of material with bleaching or cleansing or scouring liquor and steam, then subjecting the material while in motion to the action of steam only, and conducting said operations under exclusion of atmospheric air.

3. In the art of scouring, cleansing or bleaching, the improvement which consists in alternately saturating a continuously moving web or rope of material with bleaching or cleansing or scouring liquor and steam, then exposing the material to the action of steam only, varying the speed of said material according to the period of exposure, and conducting the operations under exclusion of atmospheric air.

4. A keir, comprising a vessel having at each end a chamber open at top and communicating with the vessel at bottom, said vessel having its lower portion divided into two compartments, guide rolls arranged in said end chambers, conveying rolls within the vessel to convey a textile material from the upper end of one of the end chambers to the like end of the other end chamber, and a squeezing roll co-operating with one of the conveying rolls, said rolls being arranged at a point between the two compartments, for the purpose set forth.

5. A keir comprising a vessel having its lower portion divided into two compartments for the reception of a liquid, conveying rolls for conveying a textile material from one of said compartments to the other, and a squeezing roll co-operating with one of the conveying rolls, said rolls being arranged at a point between the two compartments, in combination with a collector for collecting the liquid dropping from said rolls, substantially as set forth.

6. A keir comprising a vessel having at each end a chamber open at top and in communication with the vessel at bottom, said vessel having its lower portion divided into two compartments, conveying rolls arranged to convey a textile material from one compartment to the other, a squeezing roll co-operating with one of the conveying rolls arranged between the two compartments, a collector arranged below the last named rolls, a siphon pipe in communication with the collector and arranged outside of the keir, and a steam duct for admitting steam to said keir, substantially as and for the purposes set forth.

7. A keir comprising a vessel having its lower portion divided into two compartments of unequal area, conveying rolls arranged to convey a textile material from one compartment to the other, a squeezing roller co-operating with one of the conveying rolls and arranged between the two compartments, a collector and a conduit in communication therewith for collecting and conducting the liquid dropping from the last named roll to the outside of the keir, for the purpose set forth.

8. A keir comprising a vessel having a vertical inlet and outlet passage respectively at opposite ends, said passages communicating with the keir at their lower ends, a transverse partition dividing the lower portion of the keir into two compartments, a valved connection between said compartments, conveying rolls arranged to convey a textile material from the inlet passage to and through the compartments, and outlet passage, and a valved exhaust pipe connected with one of the compartments, substantially as and for the purpose set forth.

9. A keir comprising a vessel having a vertical inlet and outlet passage respectively at opposite ends, said passages communicating with the keir at their lower end, a transverse partition dividing the lower portion of the keir into two compartments, conveying rolls for conveying a fabric from the inlet passage to and through the compartments and outlet passage, one set of said rollers being located above the transverse partition, steam ducts extendin along the bottom of the keir and across the partition, those portions of the ducts extending along the bottom being perforated, and a steam duct for introducing steam into the keir above the partition, substantially as set forth.

10. A keir comprising a vessel having a vertical inlet and outlet passage respectively at its opposite ends, said passages communicating with the keir at their lower end, a transverse partition dividing the lower portion of the keir into two compartments, a series of pairs of conveying rolls arranged near the bottom of the keir and above the transverse partition respectively, to convey a textile material in an alternate upward and downward direction through the keir and its compartments, and rolls arranged in the upper part of the keir to convey such material in a horizontal direction alternately from one end to the other of said keir, in combination with perforated steam ducts arranged in said compartments along the bottom thereof, and a steam duct for admitting steam to the upper portion of the keir, substantially as and for the purpose set forth.

11. A keir having the end chambers, $a^2$, $a^2$, open at top, a steam chamber constituting the roof of the keir, and steam ducts for admitting steam to the interior of the keir, substantially as and for the purposes specified.

In witness whereof we have hereunto set our hands this 28th day of August, A. D. 1891.

ERNEST BENTZ.
CHARLES EDMESTON.
ALFRED EDMESTON.
HENRY ORTH,
*Administrator of the estate of Ernest Grether, deceased.*

Witnesses as to the signatures of Ernest Bentz, Charles Edmeston, and Alfred Edmeston:
PETER J. LIVSEY,
WM. FAULKNER.

Witnesses as to the signature of Henry Orth:
B. W. SOMMERS,
D. P. COWL.